Dec. 22, 1931.   A. C. DANKS   1,837,358
BURNER FOR GAS AND PULVERIZED FUEL
Filed Jan. 9, 1931   5 Sheets-Sheet 1

INVENTOR
A. C. Danks
by
James L. Bradley

Dec. 22, 1931.  A. C. DANKS  1,837,358
BURNER FOR GAS AND PULVERIZED FUEL
Filed Jan. 9, 1931  5 Sheets-Sheet 2
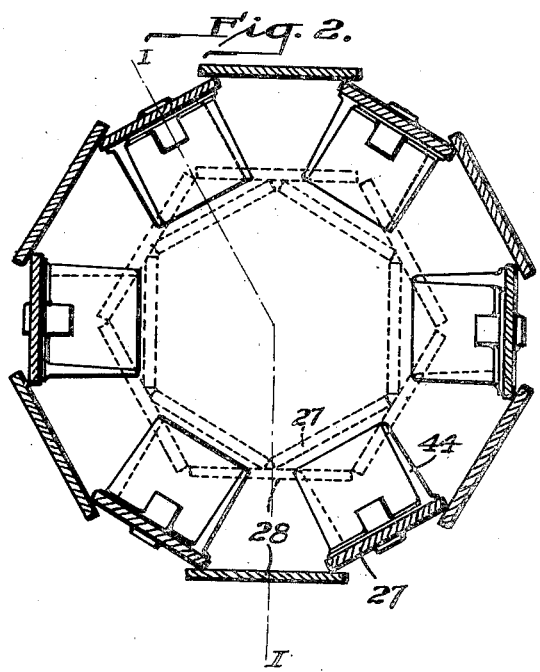
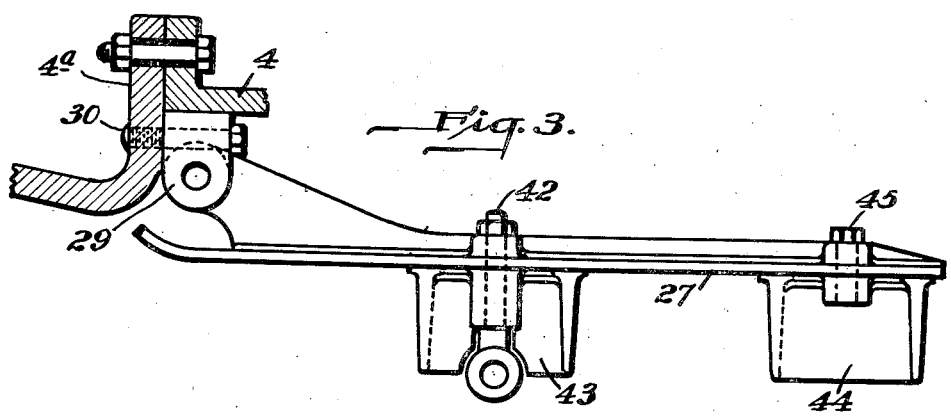
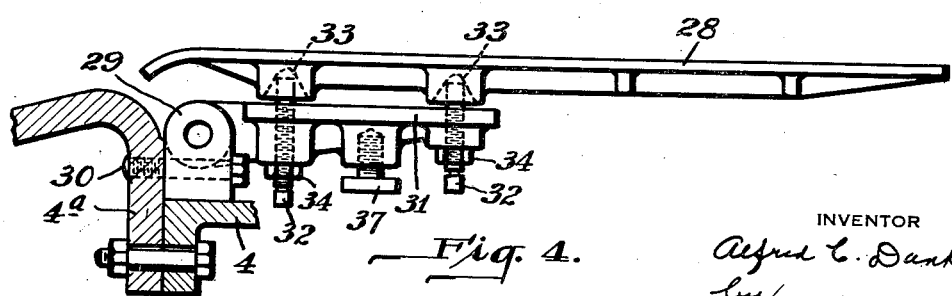
INVENTOR
Alfred C. Danks
by
James C Bradley
atty

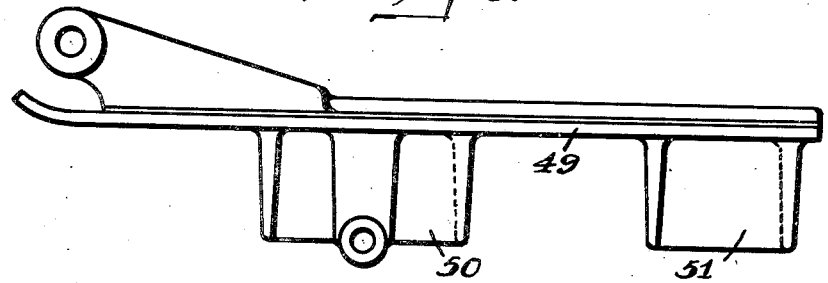
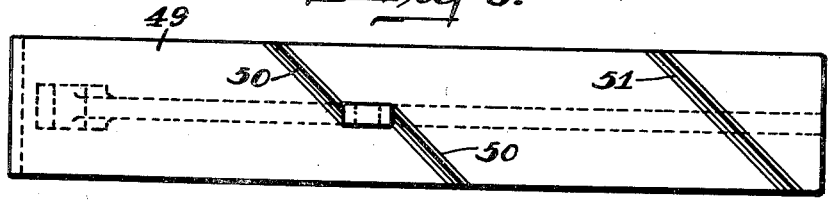
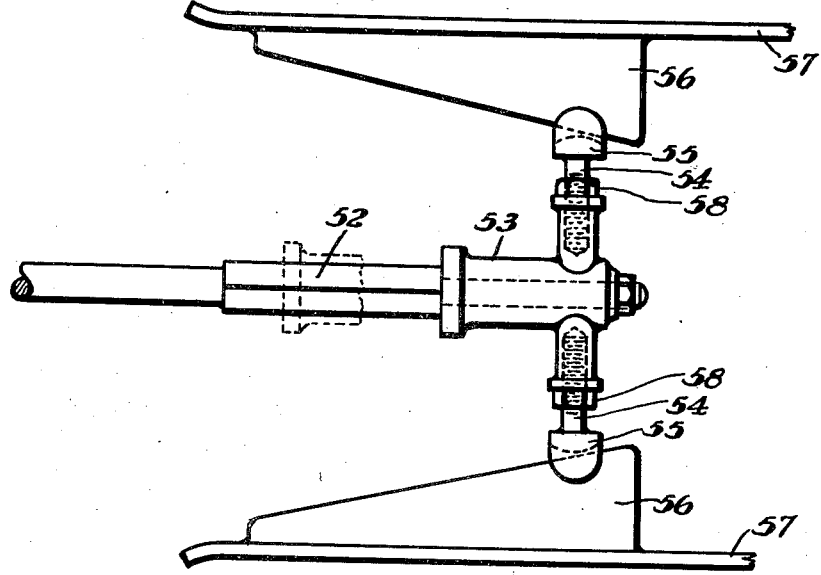

Dec. 22, 1931.    A. C. DANKS    1,837,358
BURNER FOR GAS AND PULVERIZED FUEL
Filed Jan. 9, 1931    5 Sheets-Sheet 4

INVENTOR
Alfred C. Danks
by
James E. Bradley

Dec. 22, 1931.  A. C. DANKS  1,837,358
BURNER FOR GAS AND PULVERIZED FUEL
Filed Jan. 9, 1931   5 Sheets-Sheet 5

INVENTOR
Alfred C. Danks
by
James C. Bradley
atty

Patented Dec. 22, 1931

1,837,358

UNITED STATES PATENT OFFICE

ALFRED C. DANKS, OF CLEVELAND, OHIO, ASSIGNOR TO THE ASHMEAD-DANKS COMPANY, A CORPORATION OF OHIO

BURNER FOR GAS AND PULVERIZED FUEL

Application filed January 9, 1931. Serial No. 507,620.

Figure 1:
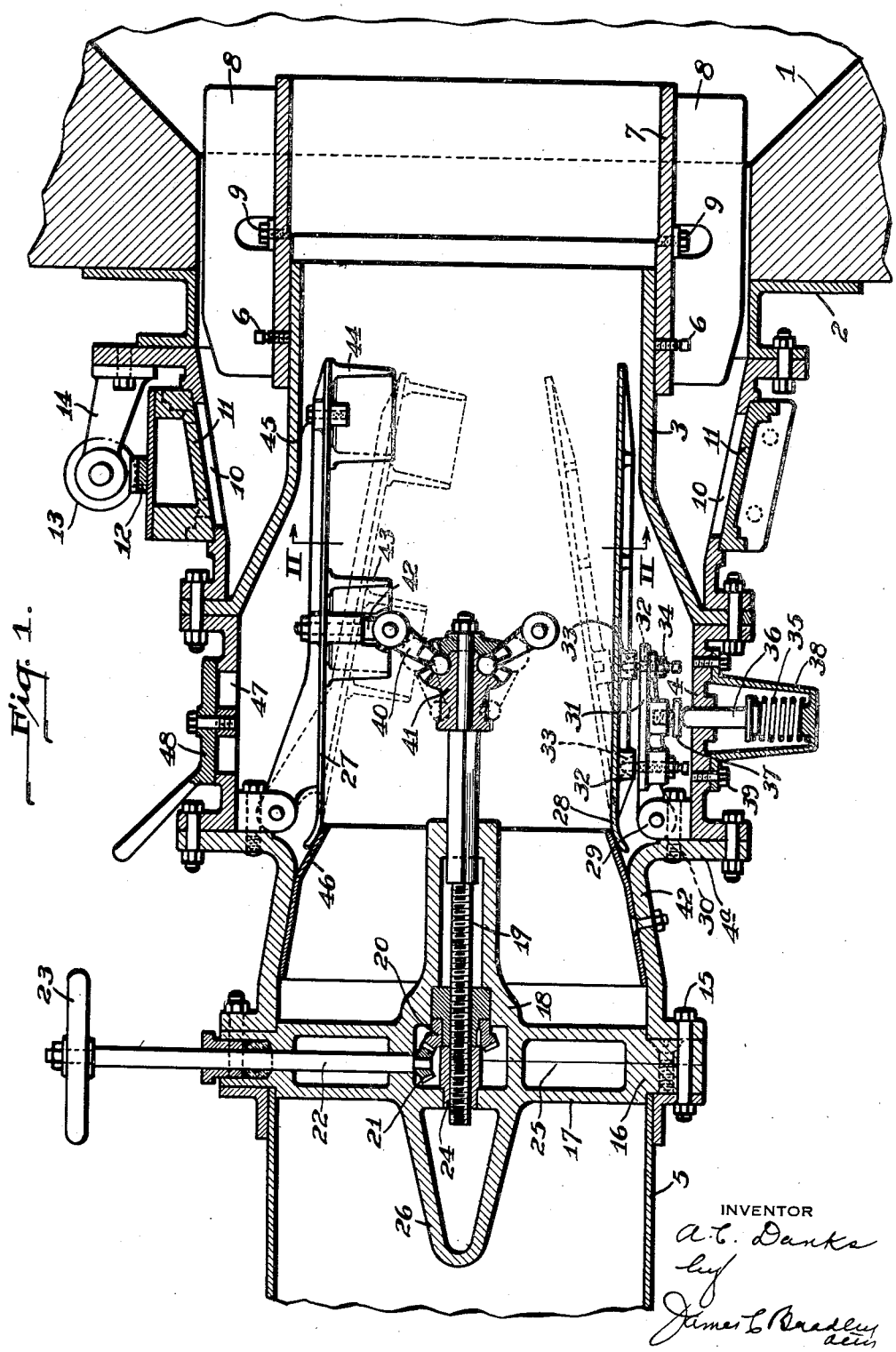
Figure 8:
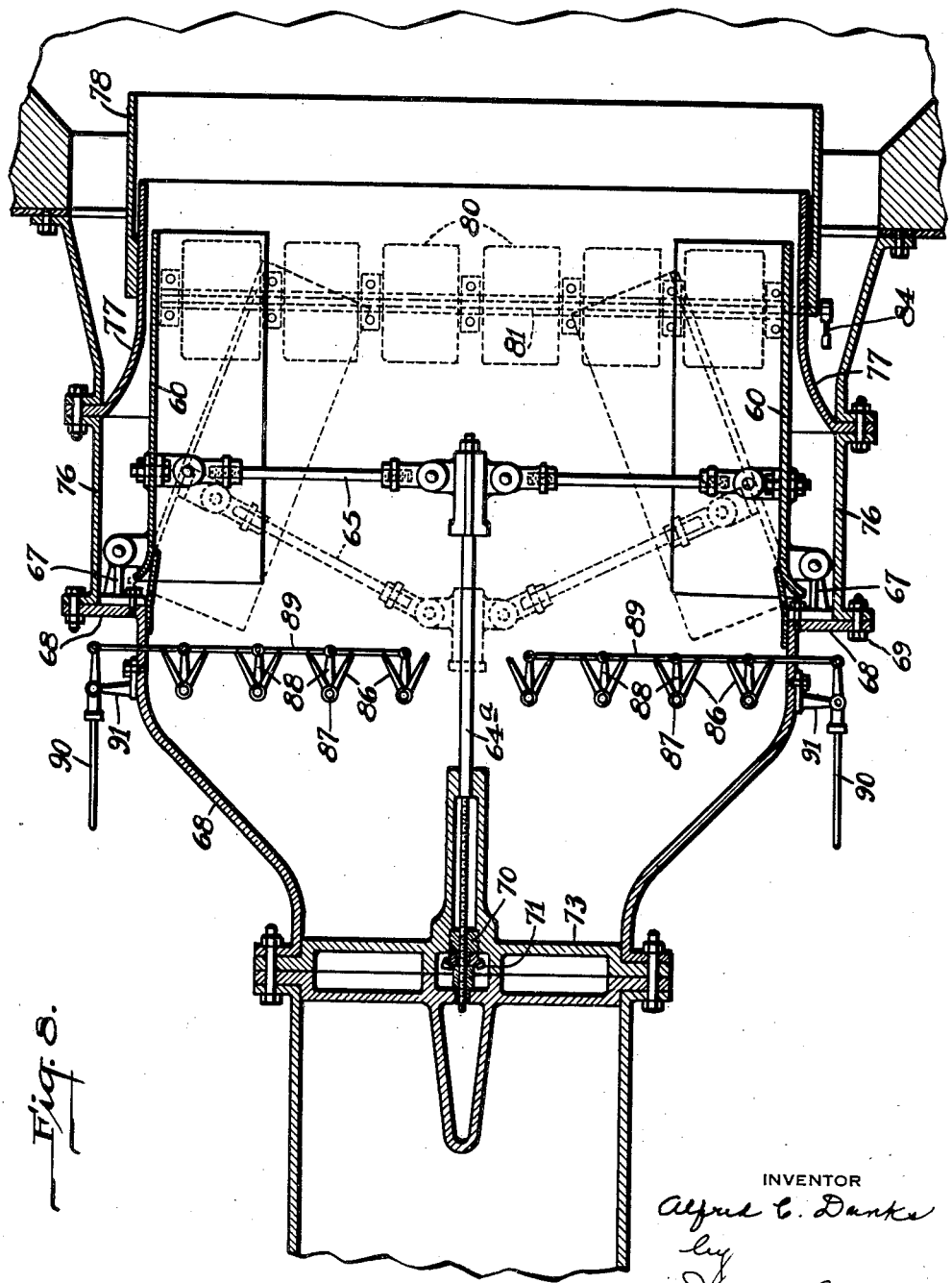
Figure 9:
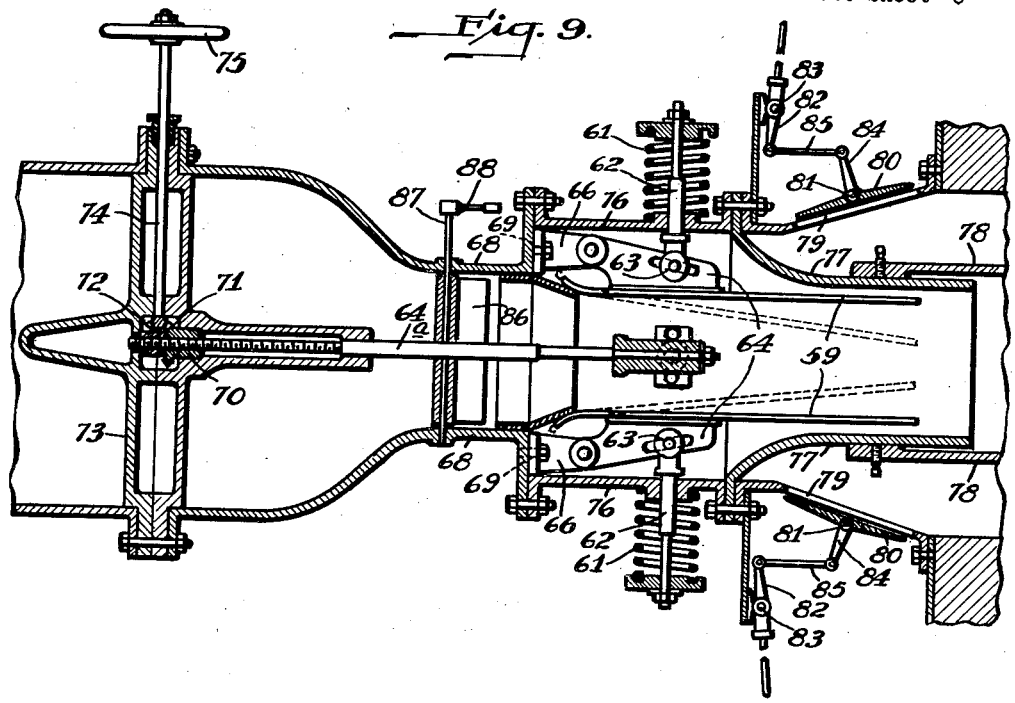
Figure 10:
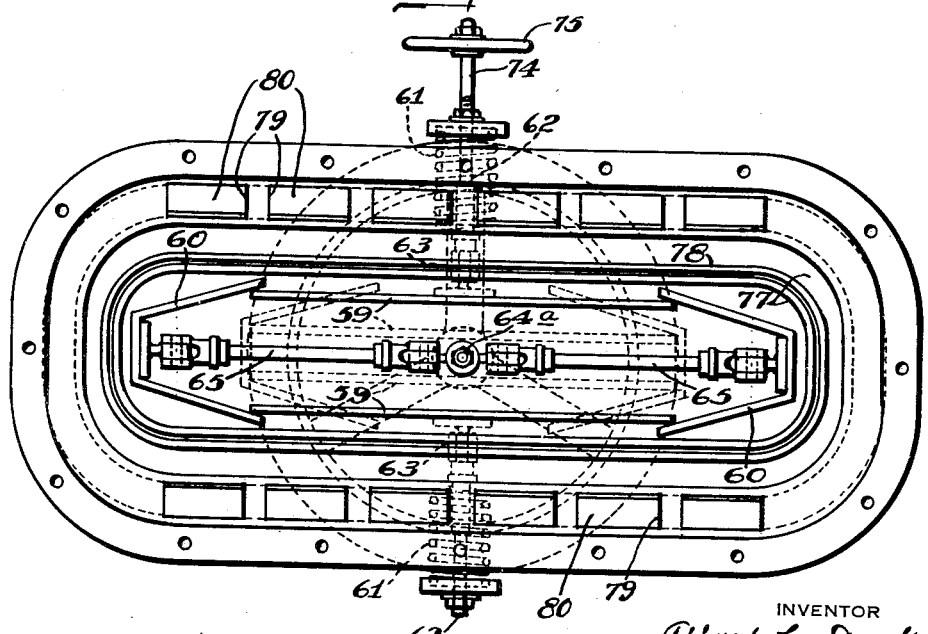

The invention relates to a burner for use with fuel of various kinds, being designed particularly for use with blast furnace gas or producer gas or pulverized fuel, but not being restricted in use to these particular fuels. It has for its primary objects, the provision of a contractible nozzle which can be varied in cross section to meet varying conditions and still maintain a symmetrical shape; the provision of a contractible nozzle in which vanes are provided for giving the fuel a whirling or spiraling movement which may be adjusted to meet requirements; the provision of a nozzle of the character specified having improved and simplified means for operating it, and for protecting the operating mechanism from the particles of solid matter always present in various fuels and carried along at high velocity; the provision of improved means whereby the position and length of the flame may be regulated; and the provision of improved means for admitting and regulating the air supply used to supplement that introduced through the burner nozzle with the fuel. Certain embodiments of the invention are illustrated in the accompanying drawings, wherein:

Figure 1 is a vertical section through one form of the nozzle on the line I—I of Fig. 2, but with all but two of the nozzle plates removed. Fig. 2 is a diagrammatic section through the burner on the line II—II of Fig. 1 showing it in its two extremes of adjustment. Figs. 3 and 4 are side elevation views on an enlarged scale of the inner and outer plates which make up the contractible nozzle. Figs. 5 and 6 are side elevation and plan views respectively of a modified form of orifice plate. Fig. 7 is a partial side elevation of a modification. And Figs. 8, 9, and 10 show another modification involving a nozzle of rectangular cross section employing only four orifice plates, Figs. 8 and 9 being longitudinal sections at 90 degrees from each other, only two of the nozzle plates in each section being shown, and Fig. 10 an end elevation.

Referring first to the construction shown in Figs. 1 to 5, 1 is a boiler setting, and 2 is an annular supporting ring for the burner suitably secured to the setting. Leading through the ring is the forward section 3 of the conduit for the gas or other fuel and air, such conduit also including the sections 4 and 4a, and the section 5 which may be curved or straight depending on conditions. The section 3 has clamped to its end by the screws 6 an extension tube 7 by means of which the distance inside the wall 1 where the flame starts may be adjusted. The tube 7 carries a plurality of turbulating vanes 8, 8 secured by the bolts 9 which permits the angular adjustment of the vanes. Supplemental air is supplied through a series of ports 10 in the ring 2, such ports being governed by an annular plate or damper 11, mounted for rotation on the ring and provided with a plurality of ports similar to the ports 10 which may be brought more or less into registration with the ports 10 to regulate the air admission area. The plate 11 is also provided with a gear 12 meshing with a worm 13 whose shaft is carried by the bracket 14. The rotation of this worm regulates the position of the plate 11 and may be accomplished by means of a suitable hand wheel (not shown) carried by the shaft of the worm. The vanes 8 may be adjusted to make the flow of supplemental air at any desired angle with respect to the body of fuel and air flowing through the tube 7.

Clamped between the opposing ends of the conduit sections 4 and 5 by the bolts 15 is a spider consisting of the rim portion 16, the arms 17 and the central casing 18. Extending longitudinally of the casing 18 is the threaded operating rod 19 for regulating the size of the nozzle opening, as later described. This rod is threaded through a bushing which carries the bevel gear 20, the gear 20 meshing with the gear 21 on the shaft 22 carrying at its outer end the hand wheel 23. A sleeve 24 acts as a thrust bearing for the gear 20. The spider is made in two sections split along the line 25 to permit of the assembling of the parts, and the hollow interior is filled with a thick lubricant, which keeps the dirt from working into the casing. The left hand end of the casing is tapered, as indicated at 26, to reduce the resistance offered to the flow of fuel and air, and the arms 17 of the spider are made of a cross section longest in the direction of flow of the gas for a similar reason.

The adjustable nozzle is, in the particular construction shown in Figs. 1 to 5, made up of a plurality of hinged overlapping plates in two series, the plates 27, six in number, constituting the inner series, and the plates 28, also six in number, constituting the outer series. The plates are hinged at their inlet ends to the blocks 29 which are secured to the conduit section 4a by the bolts 30. In order to give flexibility to the movement of the outer plates 28, so that they may adjust themselves to the inner plates 27 and contact with them throughout their length, these plates 28 are not hinged directly to the blocks 29 but are secured loosely thereto through the intermediary of the floating hinge members 31. Each member 31 is provided with a pair of screws 32 whose ends engage conical recesses 33 in the plate 28, the screws being held in adjusted positions by the lock nuts 34. The outer plates are pressed yieldingly inward by springs 35 through the intermediary of the plungers 36 which engage the screws 37 threaded into the hinge members 31 so that the tension of the springs may be adjusted. The springs are carried in pockets 38 secured to the conduit section 4 by the bolts 39. Provision is thus made for contracting the nozzle, since the outer plates which are pressed inward by the springs, press the inner plates inward because of the overlapping arrangement indicated in Fig. 2.

The inward movement of the plates is controlled from the rod 19 by means of the toggle arms 40 having ball engagement with the head 41 carried by the end of the rod. The outer ends of the toggle arms are pivoted to bolts 42 which extend through the inner plates 27 and serve as adjusting pivots for the turbulating vanes 43. The plates also carry at their forward ends the vanes 44 clamped in any desired position of adjustment by the bolts 45. The vanes 43 and 44 give the fuel a whirling or spiral movement. These may be adjusted to meet requirements, and the rotary direction of flow may be made either clockwise or counter clockwise as may be desired. In order to reduce the resistance of the air and fuel through the conduit and to prevent a collection of fuel behind the plates 27 and 28, the liner 46 is arranged so as to overlap the rear ends of such plates. To permit of the removal of any fuel collected behind the plates 27 and 28, hand holes 47 are provided at intervals in the conduit section 4, such hand holes being normally closed by the cover plates 48.

If desired, the vanes on the inner plates may be made integral instead of adjustable, as shown in Figs. 5 and 6 and various shapes and forms of vanes may be used. In the figures referred to, 49 is the body of the vane and 50 and 51 are integral with such body.

Fig. 7 involves a modification in the form of blades and in the means for governing their inward movement. Here the end of the rod 52 corresponding to the rod 19 of the Fig. 1 construction is provided at its end with a spider 53 having six arms provided with the screws 54. These screws have slotted heads 55 engaging longitudinal ribs 56 on the six inner orificial plates 57 corresponding to the inner plates 27 of the Fig. 1 construction. The outer plates are the same as in the Fig. 1 construction being pressed inward in a similar manner. When the rod 52 is moved to the left, as shown in dotted lines, the plates move inward and contract the diameter of the nozzle and when the rod moves to the right the nozzle is expanded. The screws 54 are locked in adjusted position by means of the nuts 58.

Figs. 8, 9 and 10 illustrate a modification in which the nozzle is approximately rectangular in cross section, its walls consisting of two flat side plates 59, 59, and two end plates 60, 60 which are approximately V-shape in cross section (Fig. 10). In this construction, the edges of the inner plates 59, 59 lie inside the edges of the end plates 60, 60 and are yieldingly pulled outwardly by means of the springs 61, 61. These springs act through the rods 62, 62 which have pin and slot connections at 63, 63 with the ribs 64, 64 on the plates 59, 59 (Fig. 9). The nozzle is contracted against the tension of the springs by means of the rod 64$^a$ carrying the toggle arms 65, 65 connected at their outer ends to the end plates. The plates are all hinged at their inlet ends to the brackets 66 and 67 (Figs. 8 and 9) secured to the conduit section 68 by means of the bolts 69. The nozzle is indicated in fully expanded position by the full lines and in contracted position by the dotted lines.

The rod 64$^a$ is moved endwise to control the contraction of the nozzle by mechanism similar to that described in connection with the construction of Figs. 1 to 5 and including the nut 70, the bevel gears 71, 72, the spider 73 supporting the mechanism and the shaft 74 operated by the hand wheel 75. The nozzle is carried in suitable conduit sections 68, 76, and 77, the latter of which is provided with an adjustable extension 78 similar to the extension 7 of Fig. 1. The inner faces of the plates 59, 59 may be provided with any desired number and arrangement of turbulating blades to secure a mixing action of the stream of air and fuel, as heretofore referred to in connection with the construction of Figs. 1 to 5.

A modified arrangement is also provided in the construction of Figs. 8, 9, and 10 for supplying additional air to the conduit. This arrangement includes the series of rectangular openings 79, 79 controlled by the series of dampers 80, 80 mounted on the transverse shafts 81, 81. The position of the dampers is adjusted by means of the hand levers 82, 82 pivoted at 83, 83 and connected to the arms 84, 84 on the shafts 81, 81 by means of the rods 85, 85, the arms 84 being keyed to the shafts 81. Means are also provided for further agitating and mixing the air and fuel flowing through the conduit in the form of the plurality of angle plates 86, 86 carried by the rods 87, 87. These rods are provided with lever arms 88, 88 connected by the rods 89, 89 and operated by the hand levers 90, 90 pivotally mounted on the brackets 91, 91.

If desired the shafts 22 and 74 may be operated by means of an automatic control so that the orifice may be changed in accordance to the load. The worm 13 (Fig. 1) and shafts 81 governing the air supply may also be changed automatically if desired in order to maintain any desired ratio of air to coal or other fuel. Air may also be introduced under pressure if desired.

What I claim is:

1. In combination in a burner, a conduit and an adjustable nozzle in the conduit made up of a plurality of plates which together form a complete tube of polygonal cross section, each hinged at its inlet end and free to move in and out at its other end, and means for swinging the plates in and out to provide a multi-sided nozzle of varying taper depending upon the degree at which the plates are tilted.

2. In combination in a burner, a conduit, and an adjustable nozzle in the conduit made up of a plurality of plates each hinged at its inlet end and free to move in and out at its other end, and means for swinging the plates in and out to provide a multi-sided nozzle of varying taper depending upon the degree at which the plates are tilted, a part of said plates being provided with blades or vanes projecting from the inner faces of the plates and each extending at an angle thereacross.

3. In combination in a burner, a conduit, and an adjustable nozzle in the conduit made up of a plurality of plates each hinged at its inlet end and free to move in and out at its other end, and means for swinging the plates in and out to provide a multi-sided nozzle of varying taper depending upon the degree at which the plates are tilted, a part of said plates being provided with blades or vanes each of which projects from the inner face of the plate carrying it, at right angles thereto and extends longitudinally of such plate but at an angle to its longitudinal center line.

4. In combination in a burner, a conduit, and an adjustable nozzle in the conduit made up of a plurality of plates each hinged at its inlet end and free to move in and out at its other end, and means for swinging the plates in and out to provide a multi-sided nozzle of varying taper depending upon the degree at which the plates are tilted, a part of said plates being provided with blades or vanes, each of which is secured for angular adjustment on the inner face of the plate carrying it and extends longitudinally thereof but at an angle to its longitudinal center line.

5. In combination in a burner, a conduit, and an adjustable nozzle in the conduit made up of an inner and an outer row of plates with the members of both rows spaced apart and with the plates of one row in staggered relation with respect to the plates of the other row, so that the plates of the outer row overlap the spaces between the plates of the inner row, said plates being pivoted at their inlet ends so that their other ends may be swung toward and from the center line of the nozzle.

6. In combination in a burner, a conduit, and an adjustable nozzle in the conduit made up of an inner and an outer row of plates with the members of both rows spaced apart and with the plates of one row in staggered relation with respect to the plates of the other row, so that the plates of the outer row overlap the spaces between the plates of the inner row, said plates being pivoted at their inlet ends so that their other ends may be swung toward and from the center line of the nozzle, means for moving the members of the inner row of plates in and out, and yielding means pressing the members of the outer row of plates yieldingly against the members of the inner row.

7. In combination in a burner, a conduit, and an adjustable nozzle in the conduit made up of an inner and an outer row of plates with the members of both rows spaced apart and with the plates of one row in staggered relation with respect to the plates of the other row, so that the plates of the outer row overlap the spaces between the plates of the inner row, means for pivoting the plates of the inner row to the conduit, other hinge members carried by the conduit, a lost motion adjustable connection between said hinge members and the plates of the outer row, means for moving the members of the inner row of plates in and out, and yielding means pressing the members of the outer row of plates yieldingly against the members of the inner row.

8. In combination in a burner, a conduit, and an adjustable nozzle in the conduit made up of a plurality of plates which together form a complete tube of polygonal cross section, each hinged at its inlet end and free to move in and out at its other end, and means for swinging the plates in and out to provide a tapering multi-sided nozzle of varying taper depending upon the degree at which the plates are tilted, said means comprising toggle links carried by the plates, a central member to which they are hinged, and an operating device therefor mounted in the conduit for movement longitudinally thereof.

9. In combination in a burner, a conduit, and an adjustable nozzle in the conduit made up of a plurality of plates which together form a complete tube of polygonal cross section, each hinged at its inlet end and free to move in and out at its other end, and means for swinging the plates in and out to provide a tapering multi-sided nozzle of varying taper depending upon the degree at which the plates are tilted, said means comprising toggle links carried by the plates, a central member to which they are hinged, a threaded operating rod extending axially of the conduit, a nut engaging the rod and supported against movement longitudinally thereof and gear means operable from outside the conduit for rotating said nut.

10. In combination in a burner, a conduit, and an adjustable nozzle in the conduit made up of a plurality of plates which together form a complete tube of polygonal cross section, each hinged at its inlet end and free to move in and out at its other end, means for swinging the plates in and out, comprising toggle links pivoted to the plates, a central hinge block to which they are pivoted, a threaded operating rod connected to said block, a nut engaging the rod, gear means operable from the exterior of the conduit for rotating the nut, and a gear casing mounted in the conduit and enclosing and supporting said gear means and nut.

11. In combination in a burner, a conduit, and an adjustable nozzle in the conduit made up of a plurality of plates which together form a complete tube of polygonal cross section, each hinged at its inlet end and free to move in and out at its other end, means for swinging the plates in and out, comprising toggle links pivoted to the plates, a central hinge block to which they are pivoted, a threaded operating rod connected to said block, a nut engaging the rod, gear means operable from the exterior of the conduit for rotating the nut, and a gear casing mounted in the conduit and enclosing and supporting said gear means and nut, said casing being in the form of a spider with a central cavity for the gears and nut.

12. In combination in a burner, a conduit, an adjustable nozzle in the conduit made up of a plurality of plates which together form a complete tube of polygonal cross section, each hinged at its inlet end and free to move in and out at its other end, and means for swinging the plates in and out to provide a multi-sided nozzle of varying taper, said means comprising bolts carried by the plates and adjustable transversely thereof, a rod extending longitudinally of the nozzle, means for adjusting the rod endwise, and toggle arms pivoted to the end of the rod and to the ends of said bolts.

13. In combination in a burner, a supporting ring having inlet ports therethrough with regulating means therefor, a conduit extending through the ring, a nozzle adjustable as to cross section in the conduit, and a tubular extension member mounted for longitudinal adjustment on the inner end of the conduit.

14. In combination in a burner, a supporting ring having inlet ports therethrough with regulating means therefor, a conduit extending through the ring, a nozzle adjustable as to cross section in the conduit, a tubular extension member mounted for longitudinal adjustment on the inner end of the conduit, and turbulating blades carried by said extension and provided with means whereby their angularity may be adjusted.

15. In combination in a burner, a conduit and an adjustable nozzle in the conduit made up of two side members and two end members which together form a complete tube of polygonal cross section each hinged at its inlet end and free to move in and out at its other end to provide a multi-sided nozzle of varying taper depending upon the degree at which the members are tilted, and means for adjusting the members in and out, said end members being of approximately V cross section and the side members comprising plates with their side edges overlapping the sides of the end members.

16. In combination in a burner, a conduit and an adjustable nozzle in the conduit made up of two side members and two end members which together form a complete tube of polygonal cross section each hinged at its inlet end and free to move in and out at its other end to provide a multi-sided nozzle of varying taper depending upon the degree at which the members are tilted, and means for adjusting the members in and out, said end members being of approximately V cross section and the side members comprising flat plates with their side edges lying inside the end members.

17. In combination in a burner, a conduit and an adjustable nozzle in the conduit made up of two end members of approximately V cross section and two flat side members lying with their side edges inside the end members, all of said members being pivotally supported at their inlet ends in the conduit to provide a multi-sided nozzle of varying taper depending on the degree at which the members are tilted, means for forcing the side members yieldingly outward, and means for adjusting the end members toward and from each other.

18. In combination in a burner, a conduit and an adjustable nozzle in the conduit made up of a plurality of plates which together form a complete tube of polygonal cross section, each hinged at its inlet end and free to move in and out at its other end, means for swinging the plates in and out to provide a multi-sided nozzle of varying taper depending on the degree at which the plates are tilted, and a plurality of spaced agitating vanes arranged in the conduit at the inlet end of the nozzle and mounted for tilting adjustment.

In testimony whereof, I have hereunto subscribed my name this 6th day of Jan., 1931.

ALFRED C. DANKS.